United States Patent [19]
Whittle

[11] 3,922,377
[45] Nov. 25, 1975

[54] HEAT-PROCESSED DEHYDRATED BACTERIOLOGICALLY-STABLE PORK RIND PRODUCT AND PROCESS FOR PREPARING SAME

[75] Inventor: Kenneth Frederick Whittle, Bridgenorth, England

[73] Assignee: Protein Foods (U.K.) Limited, Tipton, England

[22] Filed: July 27, 1973

[21] Appl. No.: 383,288

[30] Foreign Application Priority Data
Aug. 1, 1972 United Kingdom............... 35959/72

[52] U.S. Cl. ................ 426/645; 426/438; 426/465; 426/473; 426/641; 426/646
[51] Int. Cl.² ........................................ A23L 1/31
[58] Field of Search ........... 426/148, 149, 212, 438, 426/443, 465, 473, 441, 518, 641, 645, 646

[56] References Cited
UNITED STATES PATENTS

| | | | |
|---|---|---|---|
| 1,317,675 | 10/1919 | Allbright | 426/149 |
| 2,947,635 | 8/1960 | Paynter et al. | 426/441 |
| 3,793,467 | 2/1974 | Bundus et al. | 426/518 |

*Primary Examiner*—Hyman Lord
*Attorney, Agent, or Firm*—Bacon & Thomas

[57] ABSTRACT

A pork rind product capable of storage at ambient temperature and which may be used in the meat industry as a source of protein has a water content of less than 15% by weight, a fat content of less than 20% by weight and a particle size of less than 5 mm. The product is capable of rapid rehydration.

5 Claims, No Drawings

HEAT-PROCESSED DEHYDRATED BACTERIOLOGICALLY-STABLE PORK RIND PRODUCT AND PROCESS FOR PREPARING SAME

This invention concerns improvements in additives for food products. More particularly, it concerns such additives which are manufactured from pork rind, hereinafter referred to as "rind".

Rind is employed by the meat industry in comminuted meat products and may also be used in products in which a proportion of meat or meat-like substance is used. It provides an economical source of protein, and may be employed in varying proportions depending on the legally permitted amount for that product. However, the processing of rind is usually a time-consuming and labour-intensive operation for the manufacturer. The fresh rinds have to be stored under refrigeration, and may subsequently, if frozen, have to be thawed when required for further processing. Raw rinds may then be used but because of their high bacteriological count are normally substantially heat processed in order to arrive at a count suitable for inclusion into comminuted products. Raw rinds, again because of their physiological structure, are often heat processed in order to arrive at a softened structure suitable for inclusion into products or emulsification. The rind having been reduced to an acceptable particle size may be used in this form or, alternatively, may be combined with other proteinaceous materials, fats and additives to create mixed emulsions.

The processing of rind is a time-consuming and labour-intensive operation. Therefore, the manufacture must accurately predict his requirements for rind and rind emulsions in order to avoid the loss of inexpensive protein and fats derived from rind which would have to be replaced by other sources of protein and fats, normally more expensive.

Furthermore, rind, being a natural product, varies considerably in the proportions of such components as fat, protein and water content.

It has now been found that it is possible to process rind into a dehydrated granular form in which it is microbiologically stable for extended periods and can readily and rapidly be rehydrated into a prepared ground rind, for subsequent inclusion into, for example, a comminuted meat product or, otherwise quickly and conveniently be converted into an emulsion-type rind product with the addition of proteinaceous materials, fats and additives.

According to one aspect of the present invention there is provided a dehydrated, bacteriologically-stable, rind product having a water content of less than 15% by weight, a fat content of less than 20% by weight, and a particle size of less than 5 mm, the dehydrated rind being capable of rehydration into a rind product.

Water content may be assayed by placing a weighed sample of the material in a constant temperature oven at 105°C for 4 hours, allowing the sample to cool in a desiccator, reweighing and then calculating the percentage loss of moisture.

Fat content may be assayed by solvent extraction, e.g. with petroleum spirit.

The water content is preferably in the range 4 to 9% by weight, typically from 4 to 6% by weight. The fat content is generally in the range 4 to 16% depending on the part of the pig from which the rind is obtained. It is preferred that the water and fat contents be as low as possible, consistent with the production of a substantially stable product.

The dehydrated rind is mainly protein, this typically constituting between 70 and 96% by weight as calculated from the nitrogen content (protein content = nitrogen content × 6.25). The nitrogen content may be assayed in conventional manner e.g. after digesting a sample with sulphuric acid using a catalytic mixture of copper sulphate and sodium sulphate.

The particle size is of great importance to the properties of the product. Rehydration speed decreases as particle size increases. For most purposes, in order to combine rapid rehydration with ease of handling, a particle size in the range from 0.5 to 3 mm is preferable. Smaller particle sizes may be advantageous when the dehydrated rind is to be included into dried meat products, soups, and prepared foods.

The dehydrated rind has an appearance like that of demarara sugar, being pale brown and relatively free flowing.

The dehydrated rind of the present invention has many advantages for the manufacturer of meat products and products containing meat. It eliminates the necessity to store fresh rinds under either refrigeration or freezer conditions; the utilization of labour is substantially decreased with the reduction in handling and the elimination of prolonged heat processing followed with the subsequent cooling of said product.

The necessity to reduce the rind to a desired particle size is eliminated, unless the product of the present invention is manufactured into a mixed emulsion of such consistency that requires again a reduction in particle size before the inclusion into meat products and products containing meat.

The time saving in providing the product of the present invention is considerable. The prolonged cooking and cooling cycles may be eliminated, as well as the grinding processes, in order to arrive at the desired particle size. The product of the present invention may be ready for use in a very short space of time as opposed to an hour or more for normal fresh rinds. It can be made into a rind combination emulsion of consistent quality as opposed to the variation which may occur in quality when using a fresh rind, heat-processed or not.

The dehydrated rind can be stored for several months without refrigeration in ambient temperatures of 13°–19°C, and can be rehydrated in less than ten minutes; the time cycle varying dependant on the temperature of the water used for rehydration and the degree of agitation used during the rehydration period, but can be as short as 60 seconds.

Because of the consistent and known quality of the dehydrated rind, the manufacturer of meat products and products containing meat is able to ensure much more easily that his products meet the required legal standards.

The dehydrated rind may be manufactured, according to another aspect of the invention, by drying fresh rind to a water content of less than 15%, at between 100°–344°C with simultaneous removal of fat to a fat content of less than 15%, rapidly cooling the product and comminuting the product to a particle size of less than 5 mm, if necessary.

The product may be dehydrated in air or in oil, or a combination of both air and oil methods may be used, prior to cooling.

The dehydration may be effected at reduced pressure. If desired part of the dehydration may be effected at reduced pressure and part at atmospheric pressure.

The temperature must be carefully controlled at all stages of production to prevent degradation and gelatinisation. In order to ensure reasonably rapid dehydration, an air temperature in the upper limits of the range previously indicated is preferred for the initial stage of the dehydration. The high temperature "case hardens" the rind product. This has been found to be advantageous in preventing gelatinisation. At the same time, a proportion of the fat originally present in the rind is rendered off, and removed.

As the water content of the product falls, the temperature of dehydration may be reduced and should be carefully controlled in order to prevent degradation of the product.

It is possible to reduce the moisture content down to the final value (typically 4–6%) by careful air drying. It is, however, easier to control the final drying stage, if this is carried out in heated oil, for example in a steam-heated rendering vessel. When the required moisture content has been reached, the excess oil is drained away.

The product may, if so desired, be centrifuged or treated with a food grade oil solvent in order to reduce further the fat and oil content.

After dehydration, the product should be cooled as rapidly as possible in minimum contact with the atmosphere. In batch processes it may be convenient to cool first to ambient temperature before effecting further processing.

The adjustment of particle size may take place before heat processing or after dehydration has been completed. Alternatively, a combination of both methods may be used.

It will generally be convenient to effect at least some adjustment in particle size before dehydration in order to facilitate the carrying out of the dehydration process. Where the final adjustment in particle size is effected after completion of the dehydration the dehydrated rind may be comminuted at ambient temperature (13°–19°C) or, alternatively, it may be frozen prior to comminution. Although freezing may be effected in a refrigerator or freezer, it has been found to be preferable to effect this by treatment with a liquid gas, particularly liquid nitrogen.

Freezing with liquid nitrogen appears to result a microcrystalline-like structure of the fat in the dehydrated rind as a result of the rapid fall in temperature. Such a structure is readily broken down on comminution and lubrication effects, due to the fat, do not occur in the comminutor while the product is in a frozen state. The resulting comminuted product may them be stored at ambient temperature.

The product is rehydrated in water, preferably hot water, and rehydration rates may be increased by the inclusion into the water of edible metallic salts for example.

At a temperature of 66°–77°C, a substantial amount of rehydration takes place in about 1.5 minutes with continuous agitation. The product although like, is not entirely indentical to a fresh ground rind or a heat processed ground rind, but can replace these for most purposes. The rehydrated rind may be added to fresh meat products, for example hamburgers and sausages. It may be added to baked meat products such as pies, cooked meats, canned meat products (e.g. canned hamburgers) pastes and soups.

It may also be incorporated into products containing meat but which are not in themselves meat products, e.g. dried products such as dried soups. The dehydrated rind may be added, without previous rehydration, to such products providing that during a processing cycle rehydration occurs before consumption.

The quantity of the product which is added to food stuffs containing meat will depend on the requirements being met. Generally speaking at least 5% and not more than 15% by weight, calculated on the meat, will suffice.

It will be understood that the dehydrated product may be blended, if desired, with other materials, additives, stabilisers and emulsifiers employed in the food processing art, e.g. vegetable proteins, animal proteins, or products normally associated with or added to meat products and products containing meat.

It is a particular advantage of the dehydrated product according to the invention that it has a long storage life at ambient temperatures. The presence of antioxidants and preservatives is not generally necessary, although these may be added in the concentrations customarily employed if the storage conditions are particularly severe.

In order that the invention may be better understood, the following example is given by way of illustration.

EXAMPLE

A. Manufacture of dehydrated rind

Defatted pig rind is cut into pieces approximately 12 mm. This measurement is not critical.

The rind is then loaded into a perforated drum which is enclosed in a vented, insulated casing. The perforated drum rotates in the horizontal plane. Hot air is forced from both ends into the rotating drum, which is fitted with lifting baffles so that the rind is being both agitated and falling through the hot air stream at the same time, until the product is case hardened, which at an inlet air temperature of 250°C takes approximately ninety minutes.

In order to advance the dehydration and sterilization with a high degree of control, the rind is transferred to oil (or fat) contained in a heated vessel. The rind and oil (or fat) are constantly stirred at a temperature of 125°C until the moisture content is reduced to the final value of 4–6%.

The now dehydrated rind is removed from the oil (or fat) and transferred to a closed vessel cooled externally by cold water. The product is stirred until its temperature is reduced to ambient temperature (13°–19°C).

The resulting product is immersed in liquid nitrogen at about −75°C for 3–6 minutes and is then ground to produce a final product having a particle size of about 2 mm.

B. Rehydration of rind

Dehydrated rind manufactured according to A is rehydrated with agitation in approximately 400% of its own weight of water at 70°–77°C containing 2% of sodium chloride and 1% of sodium polyphosphate (pH 9 in 1% solution) calculated on the combined weight of water and rind. Absorption of water is approximately 400% by weight. The rehydrated rind is then cooled to at least 9°C before utilisation.

C. Utilisation of rehydrated rind

The rehydrated rind produced according to A may then be used in the manufacture of meat products and other meat-containing foodstuffs. The following is a typical formulation for the manufacture of pork sausages, the manufacture otherwise being conventional; percentages are by weight:

| | |
|---|---|
| Lean pork meat | 9.5% |
| Rehydrated rind according to B | 6.5% |
| Pork belly | 25% |
| Pork fat | 11% |
| Beef flank | 13% |
| Seasoning | 2.675% |
| Sodium polyphosphate* | 0.325% |
| Rusk | 9% |
| Farina | 2% |
| Sodium caseinate | 2% |
| Milk powder | 1% |
| Water | 18% |

*Having a pH of 7 in 1% solution.

I claim:

1. A heat-processed, dehydrated, bacteriologically-stable, pork rind product capable of rapid rehydration having a water content from about 4% to about 15% by weight, a fat content from about 4% to about 20% by weight, a protein content between 70% and 96% by weight, and a particle size from about 0.5mm to about 5mm, said percentages being based on the total weight of the product.

2. A heat-processed, dehydrated bacteriologically-stable pork rind product capable of rapid rehydration having a water content from about 4% to about 9% by weight, a fat content from about 4% to about 16% by weight, a protein content from about 70% to about 96% by weight, and having a particle size from about 0.5mm to about 3mm, said percentages being based on the total weight of the product.

3. A process for the manufacture of a bacteriologically-stable pork rind product capable of rapid rehydration which comprises the steps of drying fresh pork rind to a water content from about 4% to about 15% by weight at a temperature between 125° and 344°C with simultaneous removal of fat to a fat content from about 4% to about 20% by weight, cooling and comminuting the dried product to a particle size from about 0.5mm to about 5mm.

4. A process as defined in claim 3 wherein the cooled dehydrated rind product is frozen with liquid nitrogen prior to comminuting.

5. The process of claim 3 wherein said drying is effected by air drying the pork rind product for a time sufficient to effect case hardening of said product and then oil drying the case hardened product.

* * * * *